United States Patent
Zhong et al.

(10) Patent No.: US 10,100,385 B2
(45) Date of Patent: Oct. 16, 2018

(54) HIGH-FORMABILITY AND SUPER-STRENGTH HOT GALVANIZING STEEL PLATE AND MANUFACTURING METHOD THEREOF

(71) Applicant: BAOSHAN IRON & STEEL CO., LTD., Shanghai (CN)

(72) Inventors: Yong Zhong, Shanghai (CN); Li Wang, Shanghai (CN); Weijun Feng, Shanghai (CN); Liyang Zhang, Shanghai (CN)

(73) Assignee: Baoshan Iron & Steel Co., Ltd., Shanghai (CN)

( * ) Notice: Subject to any disclaimer, the term of this patent is extended or adjusted under 35 U.S.C. 154(b) by 396 days.

(21) Appl. No.: 14/442,426

(22) PCT Filed: Feb. 21, 2013

(86) PCT No.: PCT/CN2013/071716
§ 371 (c)(1),
(2) Date: May 13, 2015

(87) PCT Pub. No.: WO2014/075405
PCT Pub. Date: May 22, 2014

(65) Prior Publication Data
US 2016/0108492 A1   Apr. 21, 2016

(30) Foreign Application Priority Data
Nov. 15, 2012   (CN) .......................... 2012 1 0461860

(51) Int. Cl.
*C22C 33/04* (2006.01)
*C22C 38/04* (2006.01)
(Continued)

(52) U.S. Cl.
CPC ................. *C21D 9/46* (2013.01); *B22D 7/00* (2013.01); *B32B 15/013* (2013.01); *C21D 1/34* (2013.01);
(Continued)

(58) Field of Classification Search
CPC ..... C22C 33/04; C22C 33/0271; C22C 38/00; C22C 38/001; C22C 38/002; C22C 38/02;
(Continued)

(56) References Cited

U.S. PATENT DOCUMENTS

| | | |
|---|---|---|
| 2011/0175028 A1 | 7/2011 | Shimamura et al. |
| 2011/0198002 A1 | 8/2011 | Nakagaito et al. |

(Continued)

FOREIGN PATENT DOCUMENTS

| | | |
|---|---|---|
| CN | 1343262 A | 4/2002 |
| CN | 101724776 A | 6/2010 |

(Continued)

OTHER PUBLICATIONS

PCT International Search Report, PCT/CN2013/071716, dated Aug. 22, 2013.
(Continued)

*Primary Examiner* — Lois L Zheng
(74) *Attorney, Agent, or Firm* — Quarles & Brady LLP

(57) ABSTRACT

A high-formability, super-high-strength, hot-dip galvanized steel plate, the chemical composition of which comprises, based on weight percentage, C: 0.15-0.25 wt %, Si: 1.00-2.00 wt %, Mn: 1.50-3.00 wt %, P≤0.015 wt %, S≤0.012 wt %, Al: 0.03-0.06 wt %, N≤0.008 wt %, and the balance of iron and unavoidable impurities. The room temperature structure of the steel plate comprises 10-30% ferrite, 60-80% martensite and 5-15% residual austenite. The steel plate has a yield strength of 600-900 MPa, a tensile strength of 980-1200 MPa, and an elongation of 15-22%. Through an
(Continued)

appropriate composition design, a super-high-strength, cold rolled, hot-dip galvanized steel plate is manufactured by continuous annealing, wherein no expensive alloy elements are added; instead, remarkable increase of strength along with good plasticity can be realized just by appropriate augment of Si, Mn contents in combination with suitable processes of annealing and furnace atmosphere control. In addition, the steel plate possesses good galvanization quality that meets the requirement of a super-high-strength, cold rolled, hot-dip galvanized steel plate for automobiles.

15 Claims, 1 Drawing Sheet

(51) Int. Cl.
| | |
|---|---|
| C21D 9/46 | (2006.01) |
| C22C 38/00 | (2006.01) |
| B32B 15/01 | (2006.01) |
| C22C 38/02 | (2006.01) |
| C22C 38/06 | (2006.01) |
| C21D 1/74 | (2006.01) |
| C21D 1/76 | (2006.01) |
| C21D 8/02 | (2006.01) |
| C23C 2/06 | (2006.01) |
| B22D 7/00 | (2006.01) |
| C21D 1/34 | (2006.01) |
| C21D 1/52 | (2006.01) |
| C21D 1/84 | (2006.01) |
| C21D 6/00 | (2006.01) |
| C23C 2/02 | (2006.01) |
| C23C 2/26 | (2006.01) |

(52) U.S. Cl.
CPC ............ *C21D 1/52* (2013.01); *C21D 1/74* (2013.01); *C21D 1/76* (2013.01); *C21D 1/84* (2013.01); *C21D 6/005* (2013.01); *C21D 6/008* (2013.01); *C21D 8/0205* (2013.01); *C21D 8/0226* (2013.01); *C21D 8/0236* (2013.01); *C21D 8/0263* (2013.01); *C21D 8/0273* (2013.01); *C21D 8/0278* (2013.01); *C22C 33/04* (2013.01); *C22C 38/00* (2013.01); *C22C 38/001* (2013.01); *C22C 38/002* (2013.01); *C22C 38/02* (2013.01); *C22C 38/04* (2013.01); *C22C 38/06* (2013.01); *C23C 2/02* (2013.01); *C23C 2/06* (2013.01); *C23C 2/26* (2013.01); *C21D 2211/001* (2013.01); *C21D 2211/005* (2013.01); *C21D 2211/008* (2013.01)

(58) Field of Classification Search
CPC ........... C22C 38/04; C22C 38/26; C21D 1/36; C21D 1/52; C21D 1/74; C21D 1/76; C21D 1/84; C21D 2211/001; C21D 2211/005; C21D 2211/008; B22D 7/00; B32B 15/013

See application file for complete search history.

(56) References Cited

U.S. PATENT DOCUMENTS

| | | | |
|---|---|---|---|
| 2012/0175028 A1* | 7/2012 | Matsuda | C21D 8/0205 |
| | | | 148/645 |
| 2013/0133792 A1 | 5/2013 | Nakagaito et al. | |

FOREIGN PATENT DOCUMENTS

| | | |
|---|---|---|
| CN | 101939456 A | 1/2011 |
| CN | 102471849 A | 5/2012 |
| CN | 102758143 A | 10/2012 |
| EP | 1 149 928 A1 | 10/2001 |
| EP | 1978113 A1 | 10/2008 |
| EP | 2009127 A1 | 12/2008 |
| EP | 2009129 A1 | 12/2008 |
| EP | 2182080 A1 | 5/2010 |
| EP | 2415891 A1 | 2/2012 |
| EP | 2703512 A1 | 3/2014 |
| JP | S6479322 A | 3/1989 |
| JP | H01184226 A | 7/1989 |
| JP | H05179345 A | 7/1993 |
| JP | H073332 A | 1/1995 |
| JP | 2006283130 A | 10/2006 |
| JP | 2008127637 A | 6/2008 |
| JP | 2010053446 A | 3/2010 |
| JP | 2010156031 A | 7/2010 |
| JP | 2010235988 A | 10/2010 |
| JP | 2010275627 A | 12/2010 |
| JP | 2011184758 A | 9/2011 |
| JP | 2012012642 A | 1/2012 |
| JP | 2012041611 A | 3/2012 |
| TW | 201209179 A | 3/2012 |
| WO | 2005035799 A1 | 4/2005 |
| WO | 2012/020511 A1 | 2/2012 |
| WO | 2012147898 A1 | 11/2012 |

OTHER PUBLICATIONS

European Patent Office, Office Action, Application No. 13854299.8, dated Sep. 8, 2017, 4 pages.
European Patent Office, Extended European Search Report, Application No. 13854299.8, dated Jun. 28, 2016, 12 pages.
Japan Patent Office, Notification of Reasons for Refusal, Application No. 2015-542139, dated Jan. 23, 2017, 4 pages.
The State Intellectual Property Office of People's Republic of China, First Office Action and Search Report, Application No. 201210461860.6, dated Jun. 4, 2015, 12 pages.
The State Intellectual Property Office of People's Republic of China, Second Office Action and Supplementary Search Report, Application No. 201210461860.6, dated Dec. 17, 2015, 8 pages.
Textbook: "Modem Automobile Plate Technology and Forming Theory and Technology", pp. 237-242, cited in the Chinese Search Report dated Jun. 4, 2015.

* cited by examiner

HIGH-FORMABILITY AND SUPER-STRENGTH HOT GALVANIZING STEEL PLATE AND MANUFACTURING METHOD THEREOF

CROSS-REFERENCE TO RELATED APPLICATIONS

This application represents the national stage entry of PCT International Application No. PCT/CN2013/071716 filed Feb. 21, 2013, which claims priority of Chinese Patent Application No. 201210461860.6 filed Nov. 15, 2012, the disclosures of which are incorporated by reference here in their entirety for all purposes.

TECHNICAL FIELD

The invention relates to a hot-dip galvanized steel plate, particularly to a high-formability, super-high-strength, hot-dip galvanized steel plate and a method for manufacturing the same, wherein the plate has a yield strength in the range of 600~900 MPa, a tensile strength in the range of 980~1200 MPa, an elongation in the range of 15~22%, and possesses good plasticity, low cost and other characteristics.

BACKGROUND ART

It is estimated that when the weight of a vehicle is decreased by 10%, its fuel consumption will be lowered by 5%-8%, and the emission of greenhouse gas $CO_2$ and such pollutants as $NO_x$, $SO_2$, etc., will be reduced as well. Self-owned brand passenger vehicles in China are appropriately 10% heavier than their foreign counterparts, and the difference is even larger for commercial vehicles. As the main raw material of an automobile body, automobile steel plate accounts for about 60-70% of the weight of the automobile body. Massive use of high-strength and super-high-strength steel plates with strength at the level of 590-1500 MPa instead of traditional automobile steel is an optimal solution to the problem of material in order to achieve "reduced weight, less energy consumption, higher safety and lower manufacturing cost" for automobiles, and it is of great significance for the building of low-carbon society. Hence, it has been a trend in recent years for the development of steel plates to enhance the strength of the steel plates so that the thickness of the steel plates can be reduced. Development and application of advanced high-strength automobile steel mainly strengthened by phase change has been one of the mainstream subjects under research in various large steel companies around the world.

The high strength of traditional super-high-strength steel is originated from the high-strength phase structure of martensite, bainite, etc., but the plasticity and the formability are reduced significantly at the same time. Introduction of a certain amount of residual austenite into the structure of martensite or bainite is an effective technical approach to obtain high-strength and high-plasticity materials. For example, TRIP steel is composed of ferrite, bainite and residual austenite, and has relatively high strength and plasticity, but this phase structure restricts further improvement of its strength. Thus, replacement of bainite by martensite as the main strengthening phase has begun to gain attention. On the other hand, hot-dip galvanized products are used in automobiles in large quantities, up to 80% on average, and even up to 100% for some types of automobiles, due to their much better rust resistance than common cold rolled products. The development of high-strength, hot-dip galvanized steel plates starts late in China, and a full range of such steel plates are still not available. Especially, there remains a domestic blank for high-strength, hot-dip galvanized steel products exhibiting a strength of greater than 1000 MPa, superior formability and low cost, particularly for hot-dip galvanized steel products with high Si content design due to their metallurgical nature.

Japanese Patent Application JP2010-053020 discloses a high-strength, hot-dip galvanized steel plate with superior processability and a method for manufacturing the same, wherein the composition comprises, based on mass percentage, C: 0.04~0.15%, Si: 0.7~2.3%, Mn: 0.8~2.2%, P<0.1%, S<0.01%, Al<0.1%, N<0.008%, and the balance of iron and unavoidable impurities. The structure comprises 70% or higher ferrite phase, 2~10% bainite phase, 0~12% pearlite phase and 1~8% residual austenite phase. The average grain size of the ferrite is 18 μm or less, and that of the residual austenite is 2 μm or less. This inventive steel possesses a tensile strength of 590 MPa or higher and good processability (ductility and pore expandability). However, the steel of this invention is a TRIP steel with a tensile strength at the level of 600-700 MPa which can not meet the requirement of super-high-strength steel.

Chinese Patent Application CN200810119822 discloses a cold rolled, hot-dip galvanized dual phase steel at the level of 1000 MPa and a method for manufacturing the same, and pertains to the technical field of high-strength steel plates for cold rolling and galvanization, wherein the composition comprises, based on mass percentage, C: 0.06~0.18%, Si: ≤0.1%, Mn: 1.2~2.5%, Mo: 0.05~0.5%, Cr: 0.05~0.6%, Al: 0.005~0.05%, Nb: 0.01~0.06%, Ti: 0.01~0.05%, P≤0.02%, S≤0.01%, N≤0.005%, and the balance of iron and unavoidable impurities. According to this invention, Si is replaced with Cr and Mo to enlarge the dual phase area of austenite+ferrite and improve the hardenability of the dual phase steel. Meanwhile, the grains are refined by addition of alloy elements Nb, Ti to increase the strength and toughness of the steel, and impart good weldability and applicability to the steel. The strength may reach the level of 1000 MPa or higher, which can satisfy the performance requirements of super-high-strength cold rolled, hot-dip galvanized steel useful for automobiles. Nevertheless, this inventive steel has an elongation of only about 10% which cannot meet the high formability requirement of super-high-strength steel useful for automobiles. Moreover, this inventive steel requires addition of rather large amount of expensive alloy elements such as Mo, Cr, Nb, Ti, etc, rendering it unsuitable for automobile steel which needs very strict cost control.

Japanese Patent Application JP 2008-255442 discloses a super-high-strength, hot-dip galvanized steel having a tensile strength of 780 MPa or higher and a method for manufacturing the same, wherein the composition comprises, based on mass percentage, C: 0.03~0.25%, Si: 0.02~0.60%, Mn: 2.0~4.0%, Al≤0.8%, N: 0.0020~0.015%, Ti≤0.5%, Nb≤0.5%, Ti+Nb: ≥0.05%, Si: 0.02~1.00%, Cu≤1.5%, Ni≤1.5%, Cu+Ni: ≥0.05%, and the balance of iron and unavoidable impurities. The microstructure is consisted of ferrite having an average grain size of less than 5 μm and a hard second phase having an average grain size of less than 0.5 μm. The manufacture method according to this invention comprises the following steps: cooling the steel plate to 700° C. or lower within 10 seconds right after hot rolling; taking up the steel plate at a temperature between 400 and 700° C.; acid-pickling the steel plate; cold-rolling the steel plate at a rolling reduction of 35~80%; annealing the steel plate at a temperature between Ac3~950° C. for 5~200 seconds; cooling the steel plate to a temperature between 400 and 600° C. and holding at this temperature for 5 to 200 seconds; hot-dip galvanizing the steel plate; and subjecting the galvanized steel plate to alloying treatment at 540° C. or lower. This invention can realize a tensile strength of 1000 MPa and an elongation up to 18%, and thus the performance requirements of super-high-strength automobile steel are met. However, this invention entails addition of a considerable amount of alloy elements Nb, V, Ti (total amount>0.25%), which not only increases the material cost greatly, but also adds to the difficulty in casting, hot rolling and the like in the manufacture process.

SUMMARY

The object of the invention is to develop a high-formability, super-high-strength, hot-dip galvanized steel plate and a method for manufacturing the same, wherein the steel plate possesses a yield strength in the range of 600~900 MPa, a tensile strength of 980 MPa or higher, an elongation in the range of 15~22%, as well as superior formability and low cost. The steel plate is suitable for automobile structural parts and safety components.

Up to date, there are a variety of methods for manufacturing high-strength, hot-dip galvanized steel, but these methods mostly use a design of low Si, Mn contents in order to guarantee the platability of the steel plate. However, since Si, Mn are the most effective strengthening elements having the lowest cost, the degraded properties caused by the low Si, Mn design have to be compensated using expensive alloy elements such as Cr, Mo, Nb, V, etc., which not only increases the steel cost, but likely impairs the product manufacturability.

The technical solution of the invention comprises:

A high-formability, super-high-strength, hot-dip galvanized steel plate, wherein a high Mn and Si design is employed to take full advantage of the strengthening effect of alloy elements Si, Mn, etc. to achieve superior combined performances of super-high strength and high plasticity; special processes of continuous annealing and furnace atmosphere control are used to obtain a steel plate substrate with good platability; and a super-high-strength, hot-dip galvanized steel plate product having good galvanized layer quality and low cost is obtained after galvanization. The chemical composition of the steel plate comprises, based on weight percentage, C: 0.15~0.25 wt %, Si: 1.00~2.00 wt %, Mn: 1.50~3.00 wt %, P≤0.015 wt %, S≤0.012 wt %, Al: 0.03~0.06 wt %, N≤0.008 wt %, and the balance of iron and unavoidable impurities. The room temperature structure of the steel plate comprises 10~30% ferrite+60~80% martensite+5~15% residual austenite. The steel plate has a yield strength of 600~900 MPa, a tensile strength of 980~1200 MPa, and an elongation of 15~22%.

Preferably, in the composition of the steel plate, the content of C is 0.18~0.22%, based on weight percentage.

Preferably, in the composition of the steel plate, the content of Si is 1.4~1.8%, based on weight percentage.

Preferably, in the composition of the steel plate, the content of Mn is 1.8~2.3%, based on weight percentage.

Preferably, in the composition of the steel plate, P≤0.012%, S≤0.008%, based on weight percentage.

In the design of the chemical composition of the steel according to the invention:

C: It is the most basic strengthening element in steel, and is also a stabilizing element for austenite. Relatively high content of C in austenite is advantageous for increasing the fraction of residual austenite and improving the properties of the material. However, excessive C may impair the weldability of the steel products. Thus, the C content needs to be controlled in a suitable range.

Si: As an element that can inhibit formation of carbides, it has a very small solubility in carbides, and can inhibit or retard formation of carbides effectively, helping to prevent the decomposition of austenite during hot-dip galvanization, such that carbon rich austenite is formed in partitioning and retained as residual austenite to room temperature. However, excessive Si may degrade the platability of the material. Therefore, a special heat treatment process for the plate substrate must be used in hot-dip galvanization of the steel plate with high Si design to guarantee the galvanization quality.

Mn: It is a stabilizing element for austenite. The presence of Mn can lower the transformation temperature of martensite Ms and thus increases the content of residual austenite. In addition, Mn is a strengthening element for solid solution and favors the improvement of the strength of steel plate. However, excessive Mn may lead to unduly high hardenability of steel plate and is undesirable for the fine control over the structure of the material. In addition, similar to the influence of Si, a high content of Mn may also degrade the platability of the steel plate, and thus a special galvanization process is needed.

P: It has a function similar to Si. It mainly acts to strengthen solid solution, inhibit formation of carbides, and enhance the stability of residual austenite. The addition of P may deteriorate weldability significantly, and increase the brittlement of the material. In the present invention, P is considered as an impurity element and is controlled at a minimized level.

S: As an impurity element, its content is controlled at a level as low as possible.

Al: It has a function similar to Si. It mainly acts to strengthen solid solution, inhibit formation of carbides, and enhance the stability of residual austenite. However, the strengthening effect of Al is weaker than that of Si.

N: It is not an element in need of special control. N is controlled at a minimized level during smelting so as to decrease its undesirable impact on the control over inclusions.

The method of manufacturing the high-formability, super-high-strength, hot-dip galvanized steel plate according to the invention comprises the following steps:

1) smelting, casting the above composition is smelted and cast into a plate blank;
2) the plate blank is heated to 1170~1230° C. and held;
3) hot rolling the end rolling temperature is 880±30° C., and the coiling temperature is 550~650° C.;
4) acid pickling, cold rolling cold rolling reduction rate is 40-60%, and a steel strip is formed;
5) annealing continuous annealing is used in the annealing process, and a two-stage heating procedure comprising direct flame heating in an oxidative atmosphere and irradiation heating in a reducing atmosphere is used, so as to obtain a steel plate substrate having good platability, wherein the steel strip is heated to 680~750° C. by direct flame in an oxidative atmosphere and meanwhile the air-fuel ratio in the heating furnace is adjusted to control the dew point in the continuous annealing furnace at a value higher than −35° C.; then the steel strip is further heated to 840~920° C. by irradiation in a reducing atmosphere and held for 48-80 s while the $H_2$ content in the continuous annealing furnace being controlled at 8-15% with the balance of $N_2$; subsequently, the steel strip is cooled slowly to 720~800° C.

at a rate less than 10° C./s so that a proportion of ferrite is generated in the material; then, the steel strip is cooled rapidly to 260~360° C. at a rate of 50° C./s or higher so that part of austenite is converted into martensite; and then it is reheated to 460~470° C. and held for 60~120 s;

6) hot-dip galvanization the steel strip is fed into a zinc pot to complete hot-dip galvanization, wherein carbon is distributed from martensite into austenite to make austenite rich in carbon and stabilized in the above course of reheating, holding and galvanization; and eventually the steel strip is cooled to room temperature, wherein the room temperature structure of the final steel plate comprises 10~30% ferrite+60~80% martensite+5~15% residual austenit, and the steel plate has a yield strength of 600~900 MPa, a tensile strength of 980~1200 MPa, and an elongation of 15~22%.

Preferably, in step 2), the plate blank is heated to 1170~1200° C.

Preferably, in step 3), the hot rolling coiling temperature is 550-600° C.

Preferably, in step 5), the steel strip is heated to 680~720° C. by direct flame in an oxidative atmosphere.

Preferably, in step 5), the steel strip is heated to 680-750° C. by direct flame in an oxidative atmosphere for 10-30 s.

Preferably, in step 5), the dew point in the furnace is controlled at −30 to −20° C. during the direct flame heating in an oxidative atmosphere.

Preferably, in step 5), the steel strip is further heated to 860~890° C. by irradiation in a reducing atmosphere.

Preferably, in step 5), the H content in the continuous annealing furnace is controlled at 10~15% during the irradiation heating in a reducing atmosphere.

Preferably, in step 5), the steel strip is slowly cooled to 730~760° C.

Preferably, in step 5), the steel strip is rapidly cooled to 280~320° C.

Preferably, in step 5), the rapid cooling is followed by reheating to 460~465° C. and holding for 80-110 s.

In the invention, a high temperature heating furnace for hot rolling is used to hold temperature so as to facilitate full dissolution of C and N compounds, and coiling is performed at a relatively low coiling temperature so as to obtain fine precipitate and avoid flat coils. A conventional acid pickling and cold rolling process is used.

Continuous annealing is used in the annealing process, and a two-stage heating procedure comprising direct flame heating in an oxidative atmosphere and irradiation heating in a reducing atmosphere is used. First, the steel strip is heated to 680~750° C. by direct flame in a weakly oxidative atmosphere which is achieved by adjusting the air-fuel ratio, wherein the dew point in the furnace is higher than −35° C., so that an iron oxide layer is formed on the surface of the steel plate to prevent gathering of elements Si, Mn, etc. toward the surface. Then, the steel strip is heated to 840~920° C. by irradiation in the furnace comprising a reducing atmosphere, wherein the H content in the furnace is 8-15% (by volume), so that the iron oxide thin film on the surface is reduced to highly active pure iron to provide a steel plate substrate having good platability which is favorable for subsequent high quality galvanization. A high annealing temperature is used for the purpose of forming a homogenized austenite structure which is helpful for improving the steel strength. Subsequently, the steel strip is cooled slowly at a rate less than 10° C./s to 720-800° C. so that an amount of ferrite is generated, which facilitates increasing the steel plasticity. And then, the steel strip is cooled rapidly to a temperature between $M_s$ and $M_f$, so that part of austenite is converted into martensite. Then, the steel strip is reheated to the galvanization temperature and held for 60-120 s, followed by introduction of the steel strip to a zinc pot to complete the galvanization procedure where carbon is redistributed between martensite and austenite, such that austenite is rich in carbon and is stabilized, and more residual austenite is obtained, which is favorable for improving work hardening capability and formability. The final structure of the steel plate is composed of ferrite+martensite+residual austenite. Owing to the high Si design, martensite formed in the steel substantially does not decompose during galvanization, so as to ensure that the desired structure is obtained finally. At the same time, a suitable hot-dip galvanization annealing technique is employed to guarantee high quality galvanization of a steel plate having high Si content.

Beneficial Effects of the Invention

By way of an appropriate composition design, a super-high-strength, cold rolled, hot-dip galvanized steel plate is manufactured by continuous annealing under conventional hot rolling and cold rolling process conditions, wherein no expensive alloy elements are added. Instead, remarkable increase of strength along with good plasticity can be realized just by appropriate augment of Si, Mn contents in combination with suitable processes of annealing and furnace atmosphere control. In addition, the steel plate possesses good galvanization quality that meets the requirement of a super-high-strength, cold rolled, hot-dip galvanized steel plate for automobiles.

After smelting, hot rolling, cold rolling, annealing, galvanization and flattening, the steel of the invention has a good prospect of application in safety and structure parts for automobiles, particularly suitable for manufacture of vehicle structure parts and safety components that have complicated shapes and high demand on formability and corrosion resistance, such as side door bars, bumper bars, B pillars, etc.

DETAILED DESCRIPTION OF THE INVENTION

Figure 1:
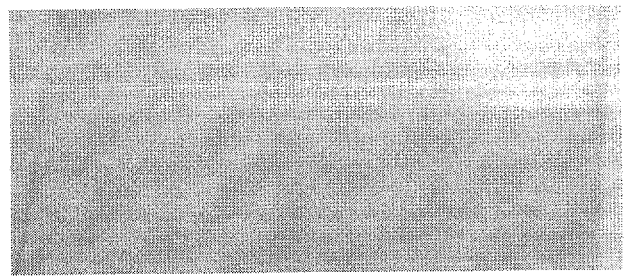
FIG. 1 is a photo showing the exemplary steel according to the invention.

The invention will be further illustrated with reference to the following examples and the accompanying drawings.

Table 1 lists the chemical compositions of the examples of the steel according to the invention.

After smelting, hot rolling, cold rolling, annealing and galvanization, there were obtained steel products of the invention, the annealing process for and the mechanical properties of which are shown in Table 2. As indicated by Table 2, a super-high-strength, cold-rolled, hot-dip galvanized steel plate having a yield strength of 600~900 MPa, a tensile strength of 980~1200 MPa, and an elongation of 15~22% has been obtained according to the invention by suitable coordination of process.

C: 0.15~0.25 wt %, Si: 1.00~2.00 wt %, Mn: 1.50~3.00 wt %, P≤0.015 wt %, S≤0.012 wt %, Al: 0.03~0.06 wt %, N≤0.008 wt %;

C content: 0.18~0.22%, Si content: 1.4~1.8%, Mn content: 1.8~2.3%, P≤0.012%, S≤0.008%.

TABLE 1

Chemical composition of the inventive steel, wt %

|  | C | Si | Mn | Cr | Mo | Nb | Ti | V | P | S | Al | N |
|---|---|---|---|---|---|---|---|---|---|---|---|---|
| Example 1 | 0.22 | 1.8 | 2.0 | — | — | — | — | — | 0.006 | 0.010 | 0.040 | 0.0043 |
| Example 2 | 0.16 | 2.0 | 1.8 | — | — | — | — | — | 0.012 | 0.007 | 0.050 | 0.0053 |
| Example 3 | 0.20 | 1.4 | 3.3 | — | — | — | — | — | 0.009 | 0.006 | 0.030 | 0.0058 |
| Example 4 | 0.18 | 1.6 | 2.3 | — | — | — | — | — | 0.008 | 0.008 | 0.050 | 0.0072 |
| Example 5 | 0.25 | 1.0 | 1.5 | — | — | — | — | — | 0.010 | 0.007 | 0.060 | 0.0064 |
| Example 6 | 0.15 | 1.2 | 3.0 | — | — | — | — | — | 0.015 | 0.012 | 0.050 | 0.0068 |
| Comp. Ex. 1 | 0.084 | 1.51 | 1.41 | — | — | — | — | — | 0.009 | 0.0014 | 0.031 | 0.0031 |
| Comp. Ex. 2 | 0.120 | 0.05 | 1.90 | 0.4 | 0.3 | 0.030 | 0.016 | — | 0.010 | 0.004 | 0.020 | 0.004 |
| Comp. Ex. 3 | 0.095 | 0.33 | 2.56 | — | — | 0.112 | — | 0.123 | 0.019 | 0.002 | 0.063 | 0.0049 |

TABLE 2

Process and mechanical properties of the Examples

| | Process number | Dew point at direct flame stage °C. | H content at irradiation stage % | Heating temperature at direct flame stage °C. | Heating time at direct flame stage s | Heating temperature at irradiation stage °C. | Heating time at irradiation stage s | Slow cooling speed °C./s | Initial temperature for rapid cooling °C. |
|---|---|---|---|---|---|---|---|---|---|
| Example 1 | i | −30 | 8 | 739 | 30 | 842 | 50 | 4 | 712 |
| | ii | −27 | 8 | 692 | 25 | 886 | 50 | 6 | 735 |
| | iii | −31 | 9 | 681 | 20 | 890 | 60 | 8 | 757 |
| Example 2 | i | −30 | 10 | 745 | 20 | 857 | 70 | 3 | 733 |
| | ii | −33 | 10 | 742 | 20 | 902 | 70 | 6 | 738 |
| | iii | −31 | 9 | 698 | 20 | 868 | 80 | 9 | 732 |
| Example 3 | i | −35 | 7 | 685 | 10 | 865 | 40 | 10 | 786 |
| | ii | −32 | 8 | 712 | 20 | 920 | 50 | 8 | 732 |
| | iii | −25 | 9 | 734 | 20 | 890 | 60 | 6 | 720 |
| Example 4 | i | −30 | 9 | 721 | 20 | 869 | 60 | 8 | 765 |
| | ii | −42 | 11 | 744 | 10 | 882 | 40 | 10 | 753 |
| | iii | −31 | 10 | 725 | 30 | 867 | 80 | 8 | 738 |
| Example 5 | i | −35 | 13 | 706 | 20 | 878 | 60 | 5 | 733 |
| | ii | −36 | 15 | 748 | 20 | 904 | 60 | 5 | 754 |
| | iii | −32 | 10 | 741 | 20 | 916 | 60 | 5 | 761 |
| Example 6 | i | −31 | 13 | 718 | 15 | 878 | 50 | 6 | 793 |
| | ii | −20 | 15 | 729 | 20 | 889 | 50 | 6 | 754 |
| | iii | −23 | 10 | 738 | 25 | 860 | 50 | 7 | 800 |
| Comp. Ex. 1 | | — | — | — | — | 850 | — | — | — |
| Comp. Ex. 2 | | — | — | — | — | 820 | — | — | — |
| Comp. Ex. 3 | | — | — | — | — | 838 | — | — | — |

| | Process number | End temperature for rapid cooling °C. | Galvanization temperature °C. | Galvanization holding time s | YS (MPa) | TS (MPa) | TEL (%) | Zinc layer adhesion |
|---|---|---|---|---|---|---|---|---|
| Example 1 | i | 351 | 469 | 110 | 679 | 968 | 21.1 | OK |
| | ii | 343 | 463 | 70 | 710 | 985 | 19.3 | OK |
| | iii | 336 | 467 | 70 | 772 | 1058 | 18.1 | OK |
| Example 2 | i | 323 | 465 | 120 | 615 | 952 | 23.5 | OK |
| | ii | 306 | 468 | 60 | 676 | 967 | 20.2 | OK |
| | iii | 287 | 464 | 70 | 715 | 1065 | 18.3 | OK |
| Example 3 | i | 283 | 458 | 80 | 812 | 1143 | 16.9 | NG |
| | ii | 286 | 452 | 100 | 783 | 1195 | 17.2 | OK |
| | iii | 331 | 454 | 90 | 705 | 1157 | 17.0 | OK |
| Example 4 | i | 280 | 456 | 70 | 822 | 1150 | 16.8 | OK |
| | ii | 289 | 462 | 80 | 825 | 1157 | 17.3 | NG |
| | iii | 260 | 466 | 100 | 776 | 1101 | 18.0 | OK |
| Example 5 | i | 360 | 470 | 60 | 701 | 988 | 20.3 | OK |
| | ii | 354 | 468 | 90 | 805 | 1012 | 18.1 | OK |
| | iii | 316 | 456 | 80 | 887 | 1098 | 18.6 | OK |
| Example 6 | i | 305 | 460 | 60 | 845 | 1112 | 18.1 | OK |
| | ii | 320 | 457 | 100 | 683 | 983 | 23.3 | OK |
| | iii | 306 | 462 | 90 | 887 | 1158 | 17.1 | OK |

TABLE 2-continued

| | | | | | | | |
|---|---|---|---|---|---|---|---|
| Comp. Ex. 1 | 520 | 490 | 50 | — | 635 | 34.9 | OK |
| Comp. Ex. 2 | — | 460 | 10 | 598 | 1022 | 9.5 | OK |
| Comp. Ex. 3 | 520 | 463 | 43 | 659 | 1001 | 18.1 | OK |

Figure 2:
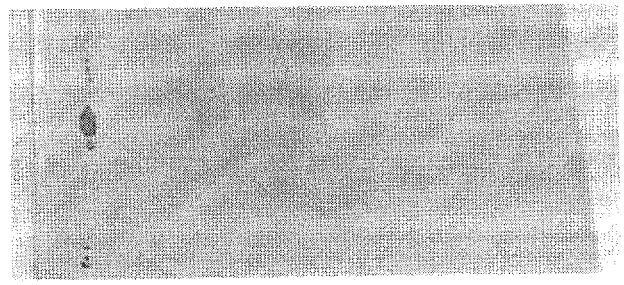
FIG. 2 is a photo showing the steel of the comparative example.

Note:
Tension test method: JIS5 tension samples were used, and the tension direction was perpendicular to the rolling direction. Test method for zinc layer adhesion: A sample plate sized 300 x 70 mm was cut from a steel plate, and cold bended to 180° on a bending machine with the bend diameter three times the plate thickness. Then, a transparent tape was adhered to the outside of the cleaned bend plate, and the tape was torn off to observe if any peeling was transferred onto the tape. If no peeling was found, the zinc layer adhesion was given a passing grade (OK); otherwise, a non-passing grade (NG) would be given.
Turn to FIGS. 1 and 2 which compare the galvanization effect between the inventive steel (using the furnace atmosphere control process according to the invention) and the Comparative Example (not using the furnace atmosphere control process according to the invention). It is demonstrated that the high Si composition of the invention results in good galvanization quality when the furnace atmosphere control process is used.

What is claimed is:

1. A high-formability, ultra-high-strength, hot-dip galvanized steel plate, consisting of:
   a) 0.15~0.25 wt % carbon (C)
   b) 1.00~2.00 wt % silicon (Si)
   c) 1.50~3.00 wt % manganese (Mn)
   d) <0.015 wt % phosphorus (P)
   e) <0.012 wt % sulfur (S)
   f) 0.03~0.06 wt % aluminum (Al)
   g) <0.008 wt% nitrogen (N), and
   h) a balance of iron (Fe) and unavoidable impurities;
   wherein the steel plate structure at room temperature consists of 10~30% ferrite, 60~80% martensite, and 5~15% residual austenite; and
   wherein the steel plate exhibits a yield strength of 600~900 MPa, a tensile strength of 980~1200 MPa, and an elongation of 15~22%.

2. The high-formability, ultra-high-strength, hot-dip galvanized steel plate of claim 1, wherein carbon is present in an amount ranging from 0.18~0.22 wt %.

3. The high-formability, ultra-high-strength, hot-dip galvanized steel plate of claim 1, wherein silicon is present in an amount ranging from 1.4~1.8 wt %.

4. The high-formability, ultra-high-strength, hot-dip galvanized steel plate of claim 1, wherein manganese is present in an amount ranging from 1.8~2.3 wt %.

5. The high-formability, ultra-high-strength, hot-dip galvanized steel plate of claim 1, wherein phosphorus is present in an amount <0.012 wt % and sulfur is present in an amount <0.008 wt %.

6. A method for manufacturing the high-formability, ultra-high-strength, hot-dip galvanized steel plate of claim 1, comprising the following steps:
   a) smelting the raw materials according to the composition of the high-formability, ultra-high-strength, hot-dip galvanized steel plate of claim 1;
   b) casting the raw materials of step a) into a plate blank;
   c) heating the plate blank of step b) to 1170~1230° C.;
   d) hot rolling the plate blank of step c) at an end rolling temperature of 880±30° C., and a coiling temperature of 550~650° C.;
   e) acid pickling the steel of step d);
   f) cold rolling the acid pickled steel of step e) to a reduction rate of 40-60%, wherein a steel strip is formed;
   g) annealing the steel strip of step f) by (1) to (5), wherein the annealing is performed in a continuous mode using a two-stage heating procedure comprising a direct flame heating in an oxidative atmosphere and an irradiation heating in a reducing atmosphere,
   (1) direct flame heating the steel strip to 680~750° C. in an oxidative atmosphere, wherein the dew point in the continuous annealing furnace is controlled at a value higher than 35° C., and the heating time is 10-30 s;
   (2) heating the steel strip to 840~920° C. by irradiation in a reducing atmosphere and holding at this temperature for 48-80 s while the H content in the continuous annealing furnace being controlled at 8~15%;
   (3) cooling the steel strip at a cooling rate of 3~10° C/s to 720~800° C. so that a proportion of ferrite is generated in the material;
   (4) cooling the steel strip to 260~360° C. at a cooling rate >50° C/s so that part of austenite is converted into martensite;
   (5) reheating the steel strip to 460~470° C. and holding at this temperature for 60-120 s;
   h) feeding the steel strip of step g) into a zinc pot to complete hot-dip galvanization, wherein carbon is distributed from martensite into austenite to make austenite rich in carbon and stabilized during the above course of reheating, holding and galvanization; and
   i) cooling the steel strip to room temperature,
   wherein, at room temperature, the structure of the steel plate consists of 10-30% ferrite, 60-80% martensite, and 5-15% residual austenite and the steel plate exhibits a yield strength of 600~900 MPa, a tensile strength of 980~1200 MPa, and an elongation of 15~22%.

7. The method of claim 6, wherein the plate blank of step c) is heated to 1170~1200° C.

8. The method of claim 6, wherein the coiling temperature of step d) is 550~600° C.

9. The method of claim 6, wherein the steel strip is heated to 680~720° C. by direct flame in oxidative atmosphere in (1).

10. The method of claim 6, wherein in (1), the dew point in the furnace is controlled at −30 to −20° C. during the direct flame heating in oxidative atmosphere.

11. The method of claim 6, wherein the steel strip is further heated to 860~890° C. by irradiation in reducing atmosphere in (2).

12. The method of claim 6, wherein in (2), the hydrogen (H) content in the continuous annealing furnace is controlled at 10~15% during the irradiation heating in reducing atmosphere.

13. The method of claim 6, wherein in (4), the steel strip is cooled to 280~320° C.

14. The method of claim 6, wherein after cooling in (4), the steel strip is reheated to 460~465° C. and held for 80~110 s in (5).

15. The method of claim 6, wherein the steel strip is cooled to 730~760° C. in (3).

* * * * *